United States Patent
Timmons

(10) Patent No.: US 6,492,060 B1
(45) Date of Patent: Dec. 10, 2002

(54) LOW RESISTANCE HIGH CONDUCTIVITY BATTERY TERMINAL

(75) Inventor: John B. Timmons, Winston-Salem, NC (US)

(73) Assignee: Concorde Battery Corporation, Winston-Salem, NC (US)

( * ) Notice: Subject to any disclaimer, the term of this patent is extended or adjusted under 35 U.S.C. 154(b) by 0 days.

(21) Appl. No.: 09/483,894

(22) Filed: Jan. 18, 2000

(51) Int. Cl.[7] .............................. H01M 2/06; H01M 2/28
(52) U.S. Cl. ..................... 429/179; 429/178; 429/121
(58) Field of Search .................. 429/178, 179, 429/121

(56) References Cited

U.S. PATENT DOCUMENTS

| | | |
|---|---|---|
| 3,595,701 A | 7/1971 | Lewis et al. |
| 3,964,934 A | 6/1976 | Ching, Jr. et al. |
| 4,078,122 A | 3/1978 | Lotzsch et al. ............ 429/121 |
| 4,117,211 A | 9/1978 | Schuster et al. ........... 429/121 |
| 4,143,215 A | 3/1979 | Mocas ........................ 429/179 |
| 4,191,807 A | 3/1980 | Karpal ....................... 429/176 |
| 4,207,384 A | 6/1980 | Peters et al. ................. 429/54 |
| 4,237,202 A | 12/1980 | Karpal ....................... 420/120 |
| 4,239,841 A | 12/1980 | Rorer ......................... 429/179 |
| 4,472,486 A | 9/1984 | Orsino et al. ............... 429/179 |
| 4,478,919 A | 10/1984 | Tiegel ........................ 429/179 |
| 4,482,618 A | 11/1984 | Orsino et al. ............... 429/179 |
| 4,645,725 A * | 2/1987 | Kump et al. ................ 429/179 |
| 4,760,001 A | 7/1988 | Nann et al. ................. 429/136 |
| 4,762,978 A | 8/1988 | Tanis ......................... 219/209 |
| 4,898,796 A | 2/1990 | Furukawa et al. .......... 429/178 |
| 5,290,646 A | 3/1994 | Asao et al. ................. 429/178 |
| 5,326,655 A | 7/1994 | Mix et al. ................... 429/178 |
| 5,403,678 A | 4/1995 | Fields ......................... 429/65 |
| 5,422,202 A | 6/1995 | Spiegelberg et al. ........ 429/179 |
| 5,527,642 A | 6/1996 | Meadows et al. ........... 429/210 |
| 5,589,294 A | 12/1996 | Spiegelberg et al. ........ 429/178 |
| 5,599,641 A | 2/1997 | Ching, Jr. et al. ........... 429/179 |
| 5,626,984 A | 5/1997 | Albini ........................ 429/178 |
| 6,001,506 A | 12/1999 | Timmons et al. ............ 429/178 |

* cited by examiner

Primary Examiner—Carol Chaney
Assistant Examiner—Tracy Dove
(74) Attorney, Agent, or Firm—Womble Carlyle Sandridge & Rice, PLLC

(57) ABSTRACT

An improved terminal post assembly for low resistance high conductivity, lead/acid batteries in which the conventional cast lead connector which connects the battery post with the terminal has been replaced by a prefabricated connector formed of a material having a non-lead content of greater than 50% and a melting temperature of greater than 450° F.

3 Claims, 5 Drawing Sheets

US 6,492,060 B1

LOW RESISTANCE HIGH CONDUCTIVITY BATTERY TERMINAL

BACKGROUND OF THE INVENTION (1) Field of the Invention

The present invention relates generally to low resistance, high conductivity lead/acid batteries such as those particularly suited for the demands of aircraft battery applications, and which draw currents of 1000 amperes or more.

(2) Description of the Prior Art

The present invention is primarily intended for and will be described in conjunction with a lead-acid aircraft battery. Many aircraft batteries must meet rigorous military performance specifications. For example Military Specification MIL-B-8565J details the performance requirements for 24 volt, 30 ampere-hour batteries used for aircraft starting. These specifications require the batteries to output a specified voltage under a variety of loads and environmental conditions. The testing results in extremely high amperage drains on the batteries for extended periods of time. Known lead terminal connector assemblies have relatively high levels of electrical resistance because of their lead content and, thus, tend to heat up during the testing. In high power usage situations (greater than 1000 amperes.), the heat generated during the testing can cause the temperature of the battery terminal assemblies to rise approximately 350° F. in a short period of time. Some Lead alloys have a melting temperature of approximately 350° F. On warm days the heat load is sometimes sufficient to melt conventional lead alloy terminal connector components causing battery failures.

External terminals for the battery are generally molded into a rather large lead plug which includes an opening in one end thereof for receiving an electrode post. The terminal is connected to the post through the lead member by melting the lead of the post and the lug together.

Some types of batteries include a wall upstanding from the cover forms a well which surrounds the opening in the cover through which the electrode post extends. The lead casting is placed around the electrode post within the aforementioned well and the two lead pieces are welded or soldered together with the lead melting and generally filling the well. This lead casting gives a high electrical resistance between the terminal and the post. The instantaneous peak power or current carrying capability is therefore diminished from what the battery is theoretically capable of producing.

Further, the lead castings (2 for each battery) provide an additional 4 ounces of weight to the battery. This extra weight is important, particularly in aircraft batteries.

In my earlier application, Serial No 08/902669, filed Jul. 30, 1997, now U. S. Patent No. 6,001,506, I described a non-lead connector which provided light weight and creep resistance, the content of which is hereby incorporated by reference.

Thus, there remains a need for a new and improved terminal post assembly for low resistance, high conductivity, lead/acid batteries which has increased current carrying capacity. Further, the terminal post assembly should be capable of withstanding the heat load described above without any melting of the terminal components.

SUMMARY OF THE INVENTION

The present invention is directed to a low resistance high conductivity battery terminal particularly adapted for aircraft use. The term "low resistance, high conductivity battery" as used herein is meant to include batteries that draw 1000 amperes or more.

This aspect of the invention is met by forming the connector of a conductive material having a non-lead content of greater than 50% and a melting temperature of greater than 450° F. Such conductive materials include, by way of example, copper, brass, bronze, copper-nickel alloys, tellurium-copper alloys, beryllium-copper alloys, and similar materials. Materials such as copper exhibit a melting temperature in the range of 750° F.

The connector may be formed entirely of the non-lead material, be formed by providing an insert of non-lead material imbedded in the lead connector, or be formed by use of a non-lead heat sink.

These and other aspects of the present invention will become apparent to those skilled in the art after a reading of the following description of the preferred embodiment when considered with the drawings.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
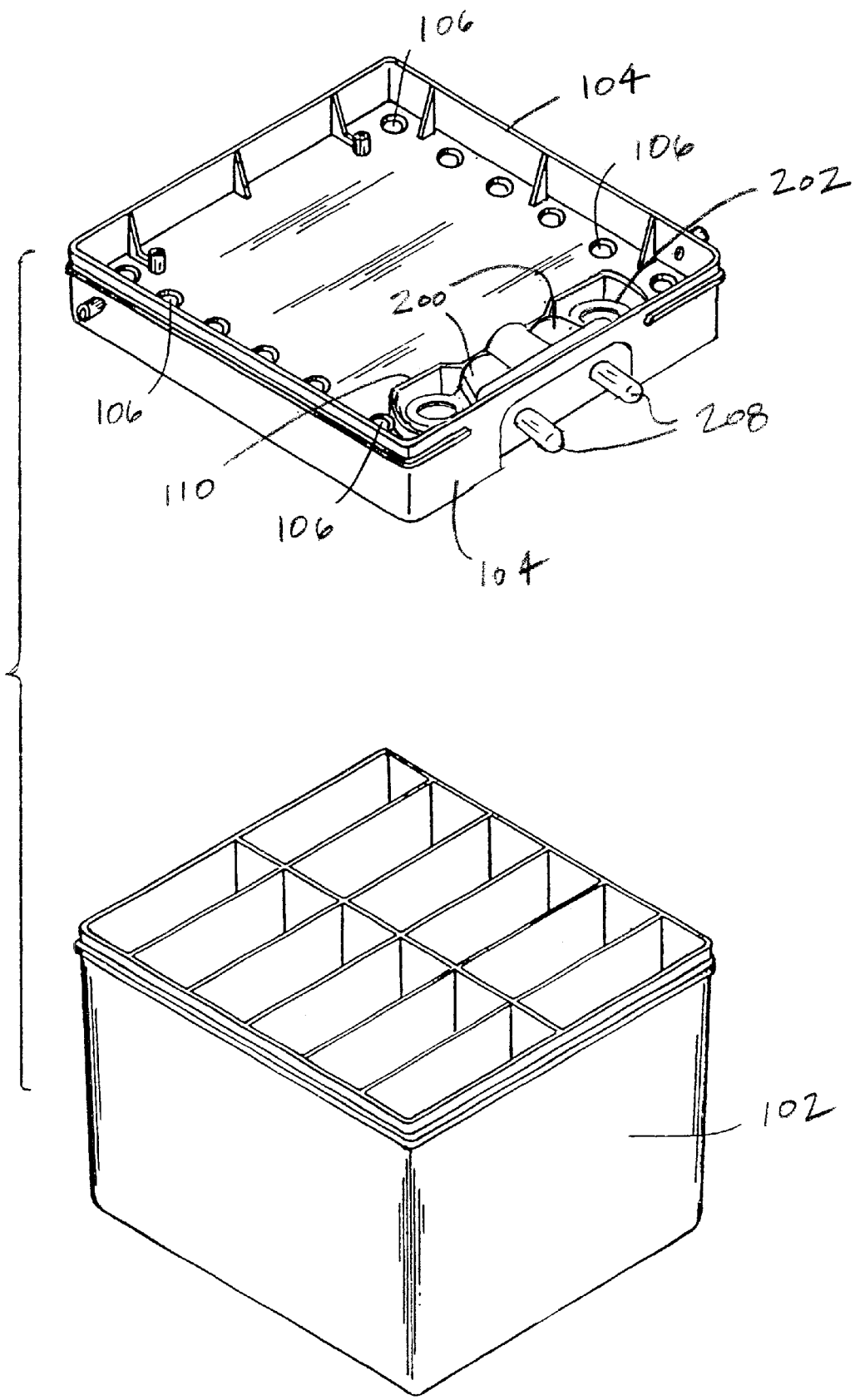
FIG. 1 is an exploded perspective view of a completed battery constructed in accordance with the present invention.

Referring now to the drawings in general and FIG. 1 in particular, it will be understood that the illustrations are for the purpose of describing a preferred embodiment of the invention and are not intended to limit the invention thereto.

The battery illustrated in FIG. 1 is typically of the configuration utilized in higher current carrying situations. Such batteries include a casing 102 typically formed of a thermoplastic material such polyethylene, polypropylene or a copolymer thereof. As is well known in the art, the casing is divided into a number of cell cavities which contain the positive and negative plates making up each cell unit. The plates in each cell unit are interconnected in known manner and are connected electrically to positive and negative battery terminal pins 208. The casing 102 is joined to a battery cover 104 which may also be formed from one of the thermoplastic materials described above. The cover includes a number of cell vent openings 106 which are provided for the purpose of venting each cell during operation and for battery maintenance.

In known batteries, for example, the battery disclosed in U.S. Pat. No. 4,482,618 to Orsino et al., the disclosure of which is hereby incorporated by reference, the terminal assemblies are embedded in the thermoplastic material making up the battery cover 104 during the injection molding process. The terminal assemblies are comprised of terminal pins which are embedded in corresponding terminal plugs. The terminal plugs are formed of lead or a lead alloy and must be combined with the terminal pins in a separate casting operation. The weight of this terminal assembly is approximately 90 grams.

Figure 4:
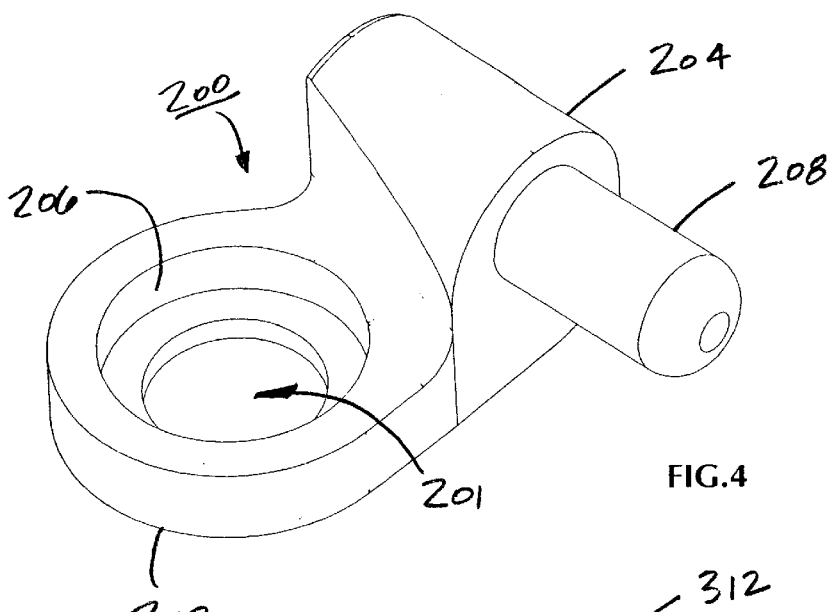
FIG. 4 is a perspective view of a first embodiment of the connector.

A terminal post assembly according to the present invention includes the connector 200 illustrated in FIG. 4 and comprises a circular, substantially flat base member 202 having an aperture 201 therein for receiving a battery electrode post. The connector 200 further includes a boss member 204 formed integrally with and extending outwardly from the base member 202 and having an integrally formed connector pin 208 for connection to the conventional quick disconnect connector of an electrical cable. The weight of this connector 200 is approximately 9 grams. The connector is comprised substantially of a material exhibiting lower resistance and higher conductivity than lead or a lead alloy. Suitable materials for this purpose have been previously described and include copper, brass, bronze (preferably phosphor-bronze), alloys thereof, or other similar highly conductive, low resistance materials. A particularly preferred material is copper, because it has the lowest resistance, highest conductivity and is very malleable or formable. In the preferred embodiment illustrated in FIG. 4, the base member 202 further includes a reservoir 206 formed therein and surrounding the aperture 201. The reservoir 206 provides an increased surface area for lead from the electrode post to attach to when the electrode post is welded directly to the connector 200.

Figure 2:
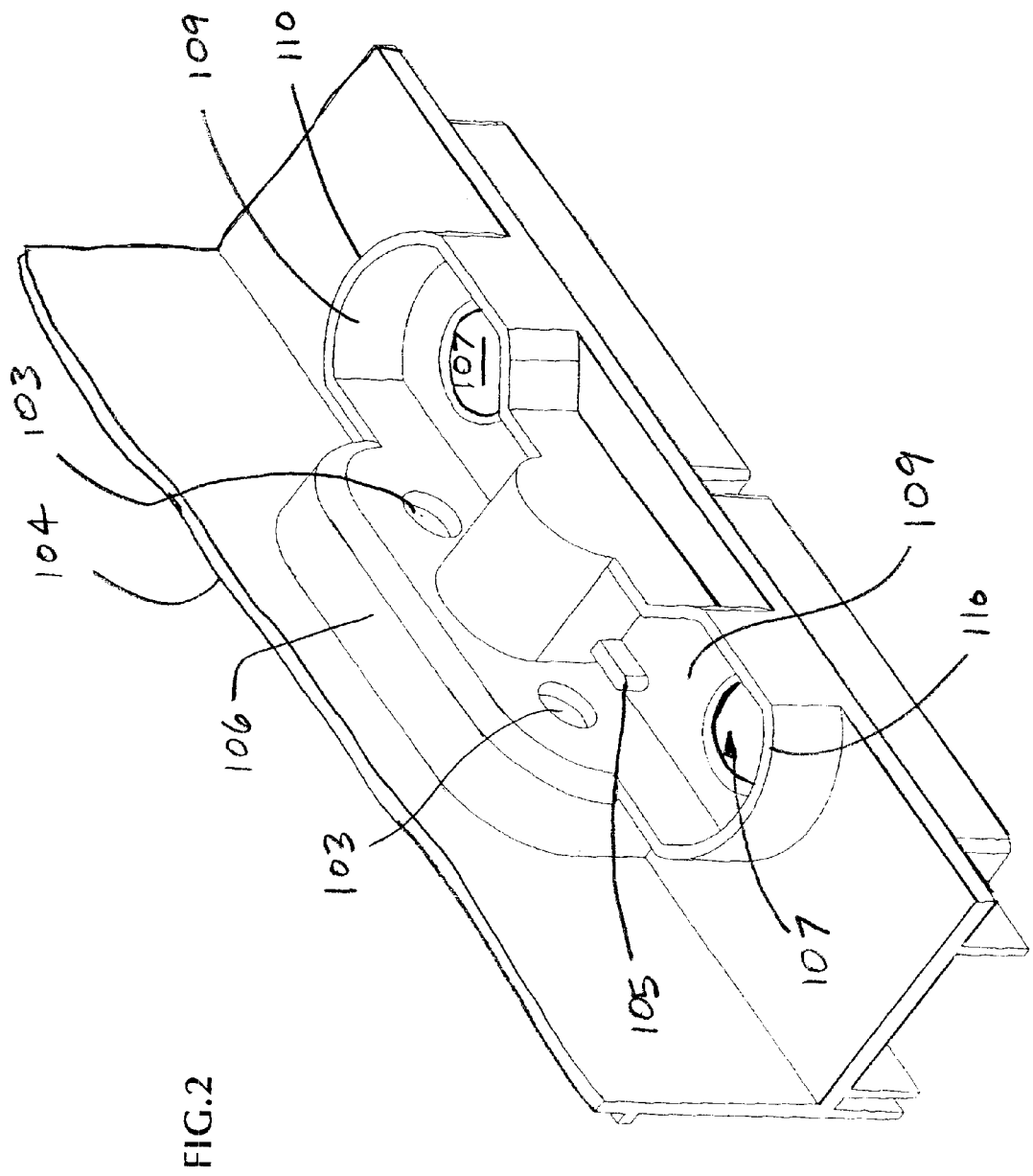
FIG. 2 is a fragmentary perspective view of the upper portion of the battery cover with the connector removed; of the present invention viewed from inside the perimeter of the battery cover.
Figure 3:
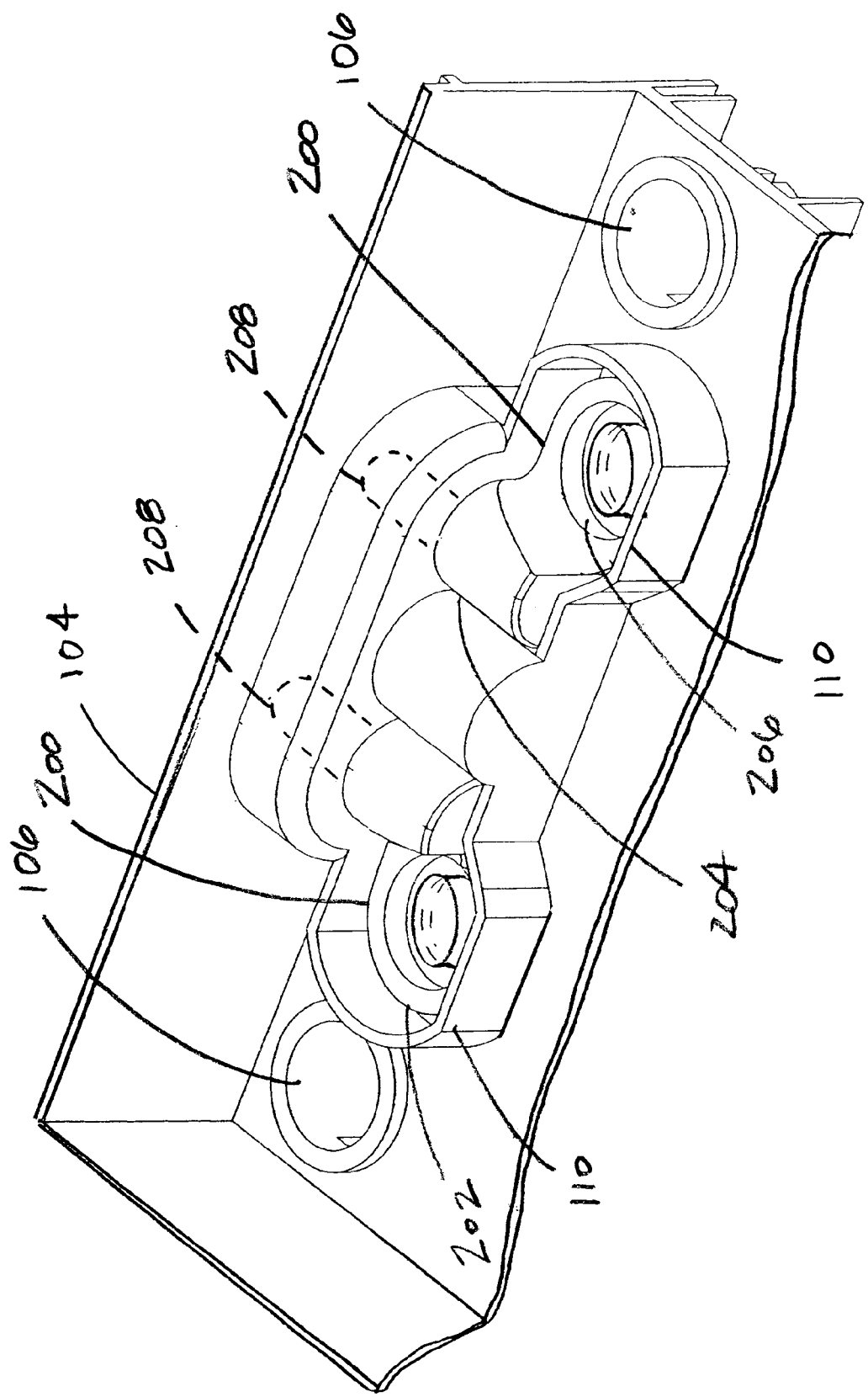
FIG. 3 is a fragmentary perspective view similar to FIG. 2, except showing the connector assembled.

In a preferred embodiment the connector 200 is used with a battery cover as illustrated in FIGS. 2 and 3. The battery cover 104 includes an opening 107 through which the lead electrode post extends. An upstanding wall 110 is formed integrally with the cover 104 and creates a well 109 around the opening 107. Terminal pin opening 103 is provided in the recessed portion 106 of the cover 104. It will be readily appreciated that a separate opening 107, upstanding wall 110 and terminal pin opening 103 are provided for both the positive and negative battery terminals. A support 105 may be provided within the well 109 to help hold the connector 200 in place as the connector 200 is installed in the well 109.

Referring now to FIG. 3, two connectors 200 have been installed in the wells 109 such that the connector apertures 201 are aligned with the battery cover openings 107. The connector terminal pins 208 extend through terminal pin openings 103 into the recessed portion 106 of the battery cover 104.

The terminal assembly is constructed by attaching the battery cover 104 to the casing 102 such that the lead electrode posts (not shown) extend upwardly through each opening 107 in the battery cover 104. An O ring (not shown) may be placed around the electrode post and positioned down in the opening 107. The O ring may be formed of any suitable material such as an elastomeric material known in the art for this purpose. The O ring provides a seal to prevent a potting compound which is applied around the electrode post to seal the battery and the battery internals. The seal is important to prevent the generation of an electrolyte mist when the battery is charged.

Next, a connector 200 is placed in each one of the wells 109 such that the terminal pins 208 extend through terminal pin openings 103. The connectors 200 are then soldered directly to the electrode posts. As described above, during the soldering operation, a portion of the lead electrode post extending above the base member 202 melts and fills the reservoir 206. This portion has a volume approximately equal to that required to fill the connector reservoir 206 when the portion is melted. Thus, a direct connection between the lead electrode post and a low resistance, high conductivity connector is established. Additional potting compound may be added to fill each well 109 so as to provide protection for the connectors 200.

Figure 5:
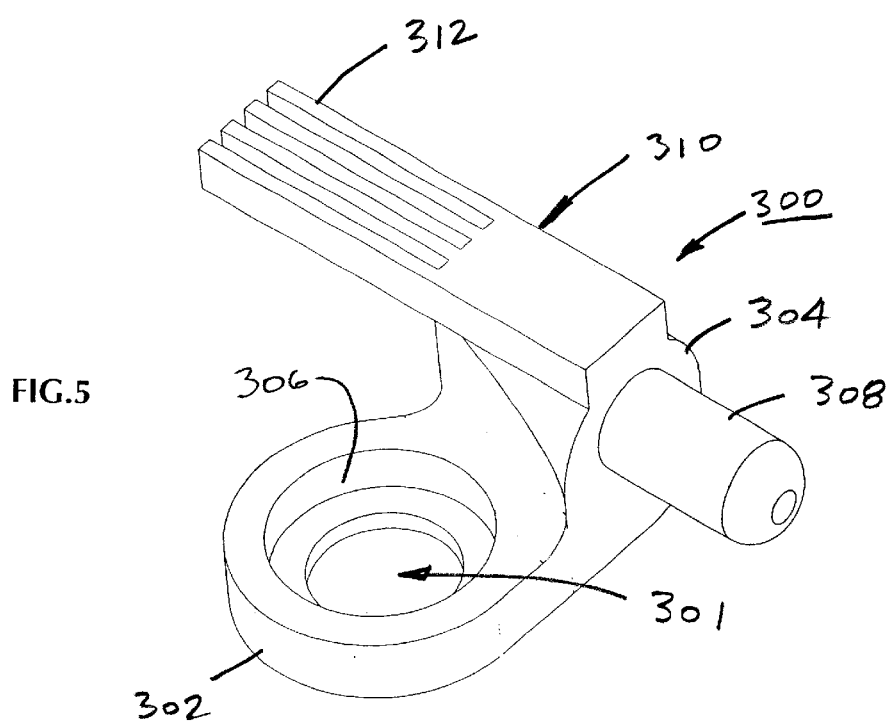
FIG. 5 is a perspective view of a second embodiment of the connector having integral cooling fins.

A second embodiment of the connector 300 is illustrated in FIG. 5. Connector 300 is somewhat similar to connector 200 in that it includes a circular, substantially flat base member 302 having an aperture 301 therein for receiving the electrode post. Boss member 304 is formed integrally with and extends horizontally from the base member 302 and further includes an integrally formed terminal pin for connection to an electrical cable. This embodiment however, differs from connector 200 in that it further includes a heat radiator 310 formed integrally with the boss member 304. As was the case with the preferred embodiment, this embodiment is formed from the same type of low resistance, high conductivity materials having a lower resistance and higher conductivity than lead. The heat radiator 310 includes a plurality of finns 312 whose purpose is to dissipate the heat generated during battery performance testing. It will be readily appreciated that the heat radiator 310 may take other forms or shapes that are suitable for the heat dissipation function.

Figure 6:
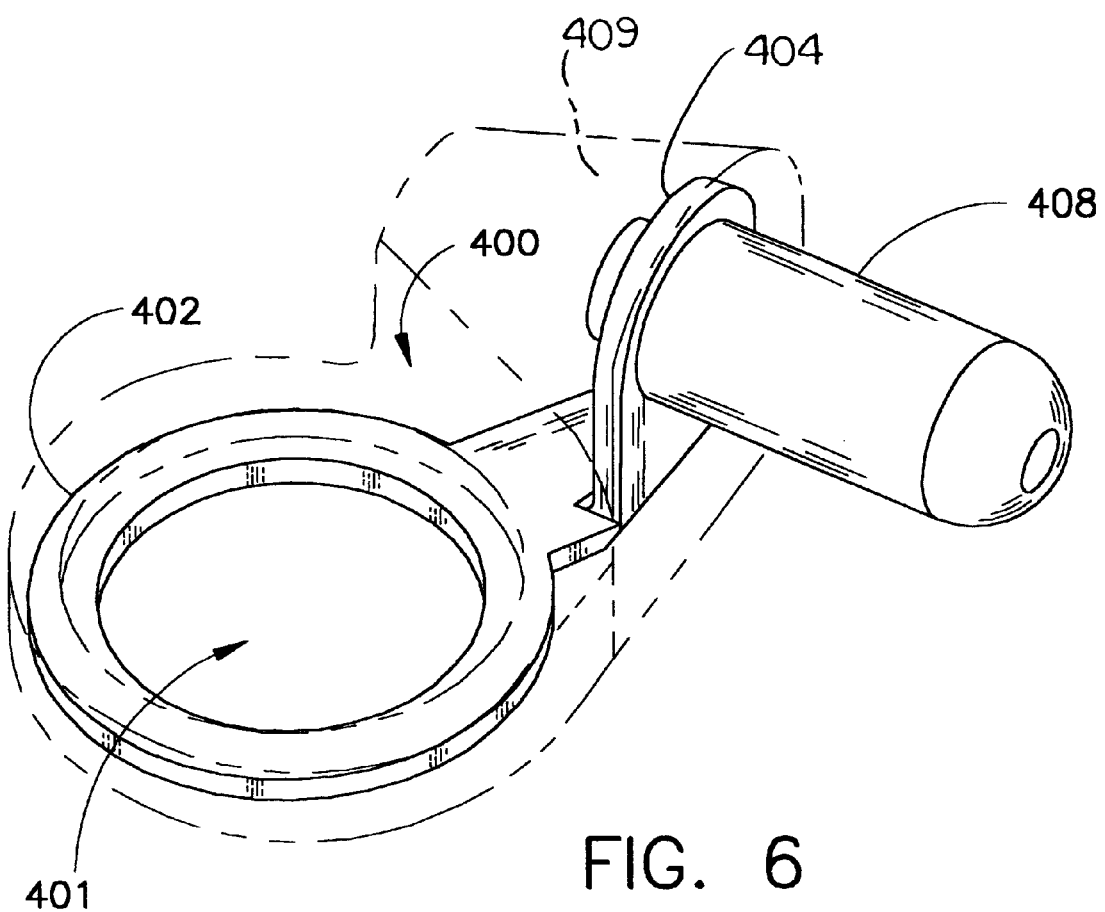
FIG. 6 is a perspective view of a third embodiment of the connector showing the insert in solid lines and the connector body in broken lines.

A third embodiment is illustrated in FIG. 6. Connector 400 is formed by imbedding a circular, substantially flat base insert 402 in a lead/tin alloy body 409. Insert 402 has an aperture 401 therein for receiving the electrode post. A vertical wall 404 is formed integrally with a horizontal extension of the base insert 402 and includes an integrally formed terminal pin 408 for connection to an electrical cable. Although the resulting terminal assembly will have a significant lead content, the lead content will be less than 50%. The connector 400 will thus provide a low resistance, high conductivity path therethrough so as to result in lower temperatures being generated during high current flow operation.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

We claim:

1. An improved connector for a low-resistance, high conductivity, lead-acid battery having a battery cover and a lead electrode post connected at one end to the plates of said battery and the other end extending through a surface of said battery cover, said connector comprising:

(a) a circular substantially flat base member having an aperture therein for receiving the electrode post;

(b) a boss member formed integrally with and extending outwardly from said base member and having an integrally formed terminal pin for connection to an electrical cable;

(c) a heat radiator formed integrally with said boss member, said heat radiator comprising a plurality of spaced apart fins extending away from said terminal pin; and (d) wherein said connector is formed with a material having a non-lead content of greater than 50% and a melting temperature of greater than 450° F.

2. The connector according to claim 1 wherein said connector further comprises a reservoir formed in said base member and surrounding said aperture for providing an increased surface area for lead from the electrode post to attach to when the electrode post is welded directly to said connector.

3. The connector according to claim 1 wherein the material having a non-lead content is selected from the group consisting of copper, brass, bronze, copper-nickel alloy, tellurium-copper alloy, and beryllium-copper alloy.

* * * * *